(12) United States Patent
Tomiyama

(10) Patent No.: US 11,003,869 B2
(45) Date of Patent: May 11, 2021

(54) MOVABLE READING APPARATUS WITH A PLURALITY OF ANTENNAS

(71) Applicant: TOSHIBA TEC KABUSHIKI KAISHA, Tokyo (JP)

(72) Inventor: Takashi Tomiyama, Nagaizumi Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 117 days.

(21) Appl. No.: 16/113,347

(22) Filed: Aug. 27, 2018

(65) Prior Publication Data

US 2019/0087615 A1  Mar. 21, 2019

(30) Foreign Application Priority Data

Sep. 15, 2017 (JP) .............................. JP2017-177446

(51) Int. Cl.
*G06K 19/00* (2006.01)
*G06K 7/10* (2006.01)

(52) U.S. Cl.
CPC ..... *G06K 7/10316* (2013.01); *G06K 7/10356* (2013.01); *G06K 7/10376* (2013.01)

(58) Field of Classification Search
USPC .......... 235/435, 439, 454, 487, 492; 340/10, 340/572
See application file for complete search history.

(56) References Cited

U.S. PATENT DOCUMENTS

| 2008/0272914 A1* | 11/2008 | Murray ............... G06K 7/0008 340/572.1 |
| 2010/0182133 A1* | 7/2010 | Ando ..................... G01S 13/62 340/10.51 |
| 2016/0239021 A1 | 8/2016 | Pous Andres et al. |

FOREIGN PATENT DOCUMENTS

| WO | WO-2008/013846 A2 | 1/2008 |
| WO | WO-2009/028255 A1 | 3/2009 |
| WO | WO-2015/055224 A1 | 4/2015 |

OTHER PUBLICATIONS

J. Zhang, Y. Lyu, T. Roppel, J. Patton and C. P. Senthilkumar, "Mobile robot for retail inventory using RFID," 2016 IEEE International Conference on Industrial Technology (ICIT), Taipei, 2016, pp. 101-106, doi: 10.1109/ICIT.2016.7474733. (Year: 2016).*
Search Report dated Jan. 4, 2019, received in corresponding European application No. 18 19 4000.8, 7 pages.

* cited by examiner

*Primary Examiner* — Matthew Mikels
(74) *Attorney, Agent, or Firm* — Foley & Lardner LLP

(57) ABSTRACT

A movable reading apparatus includes antennas, a controller, a reader, and a processor. The antennas perform transmission/reception of signals for communicating with wireless tags while the reading apparatus is moving at a prescribed moving speed. The controller switches operations of a combination of one or more antennas selected from the antennas. The reader reads identification information of the wireless tags from the signals received by the antennas. The processor sets an upper limit value of the moving speed of the reading apparatus based on a first value obtained by dividing a width of a reading range per one of the antennas by the number off combinations of the antennas.

8 Claims, 11 Drawing Sheets

FIG. 4

| | | |
|---|---|---|
| OPERATION NUMBER | | 001 |
| OPERATION CONTENT | | INVENTORY |
| NUMBER OF STORAGE POSITIONS | | 4 |
| 1 | SHELF NUMBER | A |
| 2 | SHELF NUMBER | E |
| 3 | SHELF NUMBER | F |
| 4 | SHELF NUMBER | B |

FIG. 5

| SHELF NUMBER | OPERATION START POSITION (x, y) | DIRECTION | WIDTH |
|---|---|---|---|
| A | 400,600 | 90 | 250 |
| B | 150,300 | 180 | 250 |
| C | 400,300 | 90 | 250 |
| D | 150,0 | 180 | 250 |
| E | 850,600 | 90 | 250 |
| F | 600,300 | 180 | 250 |
| G | 850,300 | 90 | 250 |
| H | 600,0 | 180 | 250 |

FIG. 7

| ITEM NUMBER | UNIQUE ID | NAME | COLOR | SIZE | SHELF NUMBER |
|---|---|---|---|---|---|
| 2201 | 0001 | SWEATER | GRAY | L | A |
| 2201 | 0002 | SWEATER | GRAY | L | A |
| 2201 | 0003 | SWEATER | GRAY | L | A |
| 2202 | 0004 | SWEATER | ORANGE | M | A |
| 2202 | 0005 | SWEATER | ORANGE | M | A |
| 2202 | 0006 | SWEATER | ORANGE | M | A |
| 2203 | 0007 | SWEAT SHIRT | PINK | M | A |
| 2203 | 0008 | SWEAT SHIRT | PINK | M | A |
| ⋮ | ⋮ | ⋮ | ⋮ | ⋮ | ⋮ |

FIG. 10

| CONDITION | MOVING SPEED V |
|---|---|
| $R_t < 0.2 R_{max}$ | $V_{max}$ |
| $0.2 R_{max} \leq R_t \leq 0.8 R_{max}$ | $(1 - R_t / R_{max}) V_{max}$ |
| $R_t > 0.8 R_{max}$ | $0.2 V_{max}$ |

$R_t$ : NUMBER OF RF TAGS TO BE READ PER UNIT TIME
$R_{max}$ : NUMBER OF RF TAGS TO BE READ PER UNIT TIME AT MAXIMUM READING EFFICIENCY

FIG. 11

| ITEM NUMBER | NUMBER OF THEORETICAL STOCKS | NUMBER OF READ ITEMS | DIFFERENCE |
|---|---|---|---|
| 2201 | 3 | 3 | 0 |
| 2202 | 3 | 2 | 1 |
| 2203 | 2 | 2 | 0 |
| ⋮ | ⋮ | ⋮ | ⋮ |

| UNDETECTED TAG ID |
|---|
| 22020005 |
| ⋮ |

MOVABLE READING APPARATUS WITH A PLURALITY OF ANTENNAS

CROSS-REFERENCE TO RELATED APPLICATION

This application is based upon and claims the benefit of priority from Japanese Patent Application No. 2017-177446, filed in Sep. 15, 2017, the entire contents of which are incorporated herein by reference.

FIELD

Embodiments described herein relate generally to a movable reading apparatus with a plurality of antennas.

BACKGROUND

In a business operation site, such as a warehouse and a retail store, in which a large number of items (products and commodities) are handled, it is required to manage such items placed or displayed on shelves and the like. For example, inventory work, is one of the management jobs for such items and is carried out, regularly. However, it takes time and labor to perform inventory work in which the number of items to be managed are precisely counted and confirmed, and thus such inventory work is one of the jobs with a heavy burden for workers and store clerks.

To reduce such burden, several inventory systems have beer, proposed. For example, in one inventory system, a navigation system and an RFID (Radio Frequency Identification) reader are mounted on an autonomous traveling carriage (robotic truck), and the robotic truck is guided by the navigation system to automatically carry out inventory work by reading RF tags (also referred to as wireless tags) attached to the items.

DESCRIPTION OF THE DRAWINGS

FIG. 4 is a diagram illustrating an operation instruction information table according to at least one embodiment;

FIG. 5 is a diagram illustrating a shelf information table according to at least one embodiment;

FIG. 7 is a diagram illustrating an item information table according to at least one embodiment;

FIG. 10 is a diagram illustrating a table showing conditions of a moving speed of an inventory robot;

FIG. 11 is a diagram illustrating a table showing inventory result information;

DETAILED DESCRIPTION

According to some embodiments, a movable reading apparatus includes a plurality of antennas, a controller, a reader, and a processor. The plurality of antennas performs transmission/reception of signals for communicating with wireless tags while the reading apparatus is moving at a prescribed moving speed. The controller switches operations of one or a combination of antennas selected from the plurality of antennas; The reader reads identification information of the wireless tags from the signals received by the plurality of antennas. The processor sets an upper limit value of the moving speed of the reading apparatus based on a first value obtained by dividing a width of a reading range per one of the plurality of antennas by the number of combinations of the antennas.

Hereinafter, certain embodiments are described with reference to the accompanying drawings.

Structure of Reading Apparatus

Figure 1:
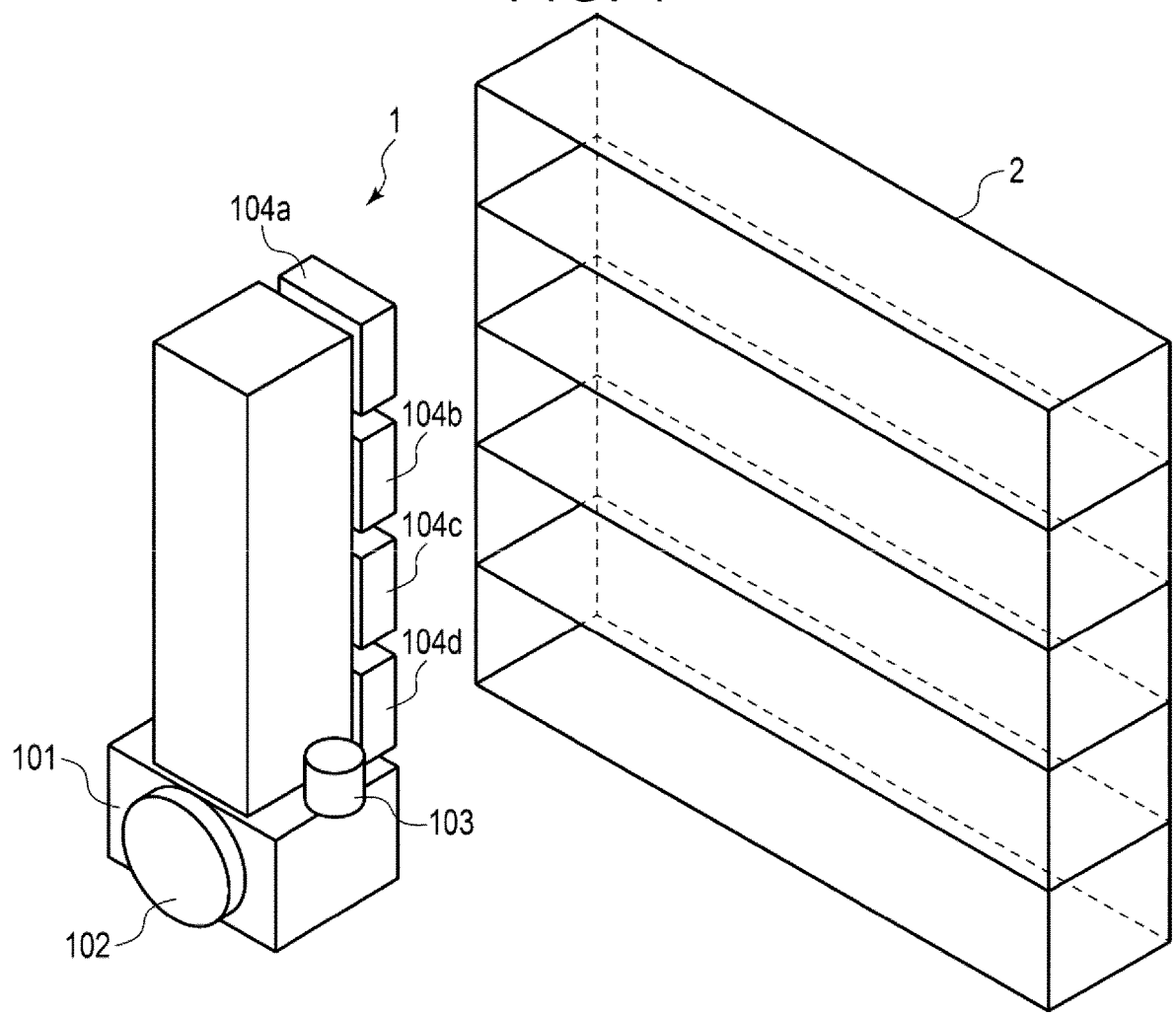
FIG. 1 is a perspective view illustrating an inventory robot and a positional relationship between the inventory robot and a shelf according to at least one embodiment.
Figure 2:
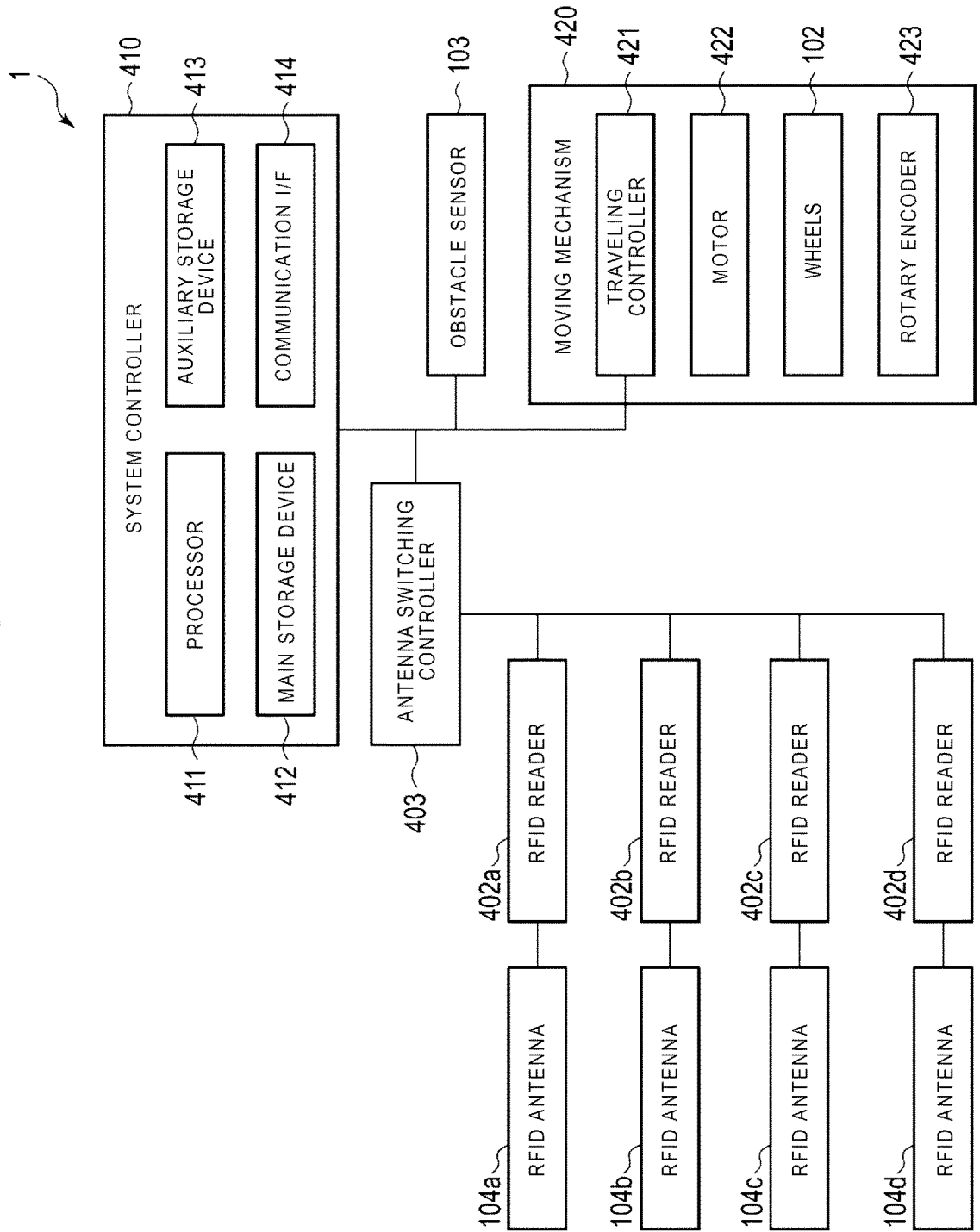
FIG. 2 is a block diagram illustrating functional components of the inventory robot shown in FIG. 1.
Figure 3:
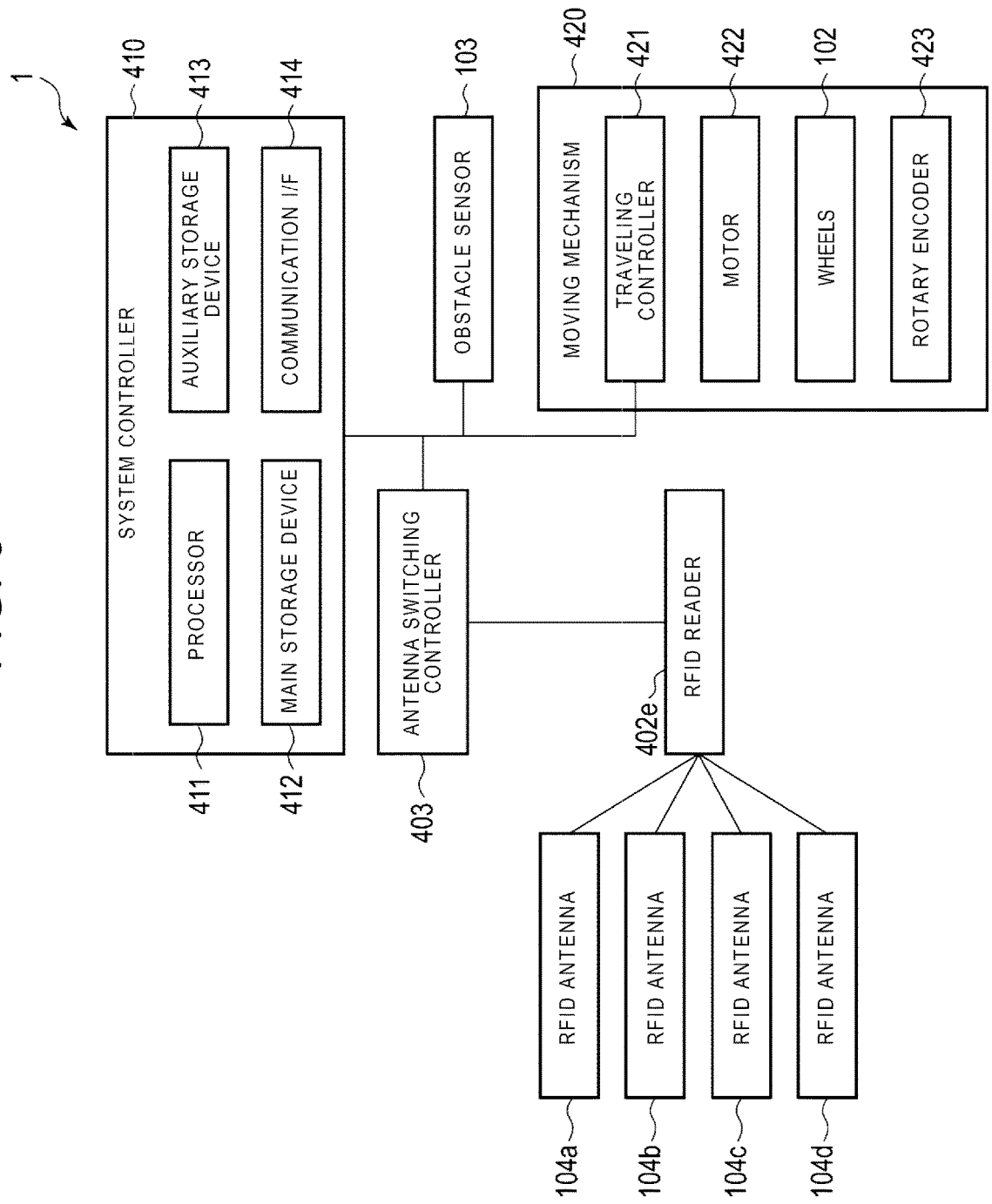
FIG. 3 is a block diagram illustrating other functional components of the inventory robot of FIG. 1.

FIG. 1 is a perspective view illustrating an inventory robot and a positional relationship between the inventory robot and a shelf according to some embodiments, FIG. 2 is a block diagram illustrating the inventory robot shown in FIG. 1 in a case in which four units of one RFID antenna for each RFID reader are provided, and FIG. 3 is a block diagram illustrating the inventory robot in a case in which four RFID antennas are provided for one RFID reader. The inventory robot is an example of the reading apparatus in at least one embodiment.

As shown in FIG. 1, an inventory robot 1 includes an enclosure 101, wheels 102, an obstacle sensor 103, and RFID antennas 104a, 104b, 104c, and 104d. For example, the RFID antennas 104a, 104b, 104c, and 104d are linearly arranged in a vertical direction (also referred to as "z-axis direction") and are antennas of substantially the same size. Since the sizes of the RFID antennas 104a, 104b, 104c, and 104d are largely the same, the reading ranges of these antennae are also substantially the same. In some embodiments, inventory robot 1 may have four RFID antennas, but the inventory robot is not limited to four antennas, and it is preferable to use a plurality of RFID antennas.

Further, as shown in FIG. 2, the inventory robot 1 includes a system controller 410, RFID readers 402a, 402b, 402c, and 402d, an antenna switching controller 403, and a moving mechanism 420. The RFID antennas 104a, 104b, 104c, and 104d are collectively referred to as an RFID antenna 104 in the following description. Also, the RFID readers 402a, 402b, 402c, and 402d are collectively referred to as an RFID reader 402.

The wheels 102, the obstacle sensor 103, and the RFID antenna 104 are attached to the enclosure 101. In the enclosure 101, a part or all of the system controller 410, the RFID reader 402, the RFID antenna switching controller 403, and the moving mechanism 420 are housed. For example, the inventory robot 1 and a host device may be arranged to wirelessly communicate with one another, the host device may have a part of the units described above, and the enclosure 101 may have the remaining units.

The wheels 102 are attached to the enclosure 101. The wheels 102 rotate by a driving control of the moving mechanism 420 to move the enclosure 101 horizontally (either "x-axis direction" or "y-axis direction"). In at least one embodiment, the enclosure 101 including the RFID antenna 104 moves in a horizontal direction by the rotation of the wheels 102 in an area at the near side of a shelf 2 on which, for example, items are placed. In at least one embodiment, the item indicates a commodity and/or a product in accordance with the situation. The width direction of the shelf 2 corresponds to the x-axis direction, the depth direction of the shelf 2 corresponds to the y-axis direction, and the height direction of the shelf 2 corresponds to the z-axis direction.

The obstacle sensor 103 is used to detect an obstacle while the inventory robot 1 moves. The obstacle sensor 103 includes an optical sensor, or an ultrasonic sensor, but is not limited thereto, and is composed of sensors of various systems. The obstacle sensor 103 is attached to the enclosure 101. For example, the obstacle sensor 103 is provided on the front upper surface of the enclosure 101 with respect to the moving direction of the inventory robot 1 by rotation of the wheels 102.

The RFID antenna 104 performs a transmission/reception of radio waves modulated with signals with which the RFID reader 402 described later communicates with an RF tag (also referred to as "wireless tag") attached to the item. For example, the RF tag may be attached directly to an item with an adhesive or the like or may be attached with a binding material or the like.

The system controller 410 performs an operation control of each part, information processing, and the like. The system controller includes a processor 411, a main storage device 412, an auxiliary storage device 413, and a communication I/F (interface) 414.

The processor 411 is, for example, a CPU (Central Processing Unit). The processor 411 realizes various processing functions by executing an application program. For example, the processor 411 implements an inventory processing described later by executing a program. By executing a program, the processor 411 implements setting of an upper limit value Vmax of the moving speed of the inventory robot 1 in the horizontal direction at the time of reading an ID (Identifier) code of the RF tag described later. Further, the processor 411 implements an antenna switching described later by executing a program.

The main storage device 412 is a memory such as a ROM (Read-Only Memory) and a RAM (Random-Access Memory) for the processor 411 which executes various processing. The ROM serving as the main storage device 412 stores programs executed by the processor 411, The RAM serving as the main storage device 412 stores operation data and the like and provides a work area for the processor 411.

The auxiliary storage device 413 is a rewritable nonvolatile memory. The auxiliary storage device 413 is, for example, an HDD (Hard Disk Drive), an SSD (Solid-State Drive), or the like. The auxiliary storage device 413 stores application programs and data for executing each processing described later. For example, the auxiliary storage device 413 stores programs for the processor 411 which performs control of each part and a data processing as an information collection processing described later.

The communication I/F 414 is a communication unit for communicating with the host device (not shown). For example, the processor 411 receives information and instructions supplied from the host device via the communication I/F 414. The processor 411 transmits information and data collected by the inventory processing to the host device via the communication I/P 414.

The RFID reader 402 is a device that communicates with an RF tag attached to an item by radio waves and reads (decodes) information (for example, ID code (also referred to as "identification information") of an RF tag) from radio waves. The RFID reader 402 is connected to the RFID antenna 104 by an antenna cable (not shorn). If the RFID readers 402 are respectively connected to the RFID antennas 104 one by one, the RFID antenna 104 may be integrated with the RFID reader 402. As shown in FIG. 3, a plurality of RFID antennas 104a, 104b, 104c, and 104d may be connected to one RFID reader 402e.

The RFID antenna switching controller 403 outputs an instruction to the RFID reader 402 to switch the RFID antenna 104 which is used for communication with the RF tag. The RFID antenna switching controller 403 notifies the system controller 410 of information (reading result of the RF tag) read from the RF tag by the RFID reader 402. In at least one embodiment, the RFID antenna switching controller 403 is described as hardware independent of the system controller 410. However, the RFID antenna switching controller 403 may operate as a part of the processing function executed by the system controller 410. In addition, as shown in FIG. 3, if only RFID reader 402e is mounted on the inventory robot 1 and is connected to the plurality of RFID antennas 104a, 104b, 104c, and 104d, the antenna switching controller 403 may operate as a part of the function executed by the RFID reader 402e.

As shown in FIGS. 2 and 3, the moving mechanism 420 includes a traveling controller 421, a motor 422, wheels 102, and a rotary encoder 423. The traveling controller 421 controls driving of the motor 422. In at least one embodiment, the traveling controller 421 drives the motor 422 in response to a control instruction from the system controller 410. The motor 422 drives the wheels 102 attached to the enclosure 101.

Information Used for Inventory Processing

Next, various kinds of information used for the inventory processing for collecting information on the RF tags of items placed on the shelf by the inventory robot 1 is described.

FIG. 4 is a diagram illustrating an operation instruction information table indicating an operation procedure in accordance with which the inventory robot 1 performs an inventory processing. The operation instruction information table is stored in the auxiliary storage device 413, for example. In the system controller 410, the processor 411 controls an operation for performing the inventory processing according to the operation instruction information, stored in the auxiliary storage device 413. The operation instruction information may be supplied from the host device.

In the table shown in FIG. 4, the operation instruction information includes an operation number, operation content, the number of placing positions and a shelf number. The operation number is a management number for managing an operation indicated by the operation instruction information. The operation number is a unique number assigned for each operation (each operation instruction). The number of placing positions indicates the number of shelves on which an operation is instructed by one operation instruction specified by the operation number. The shelf number indicates a shelf, which is subject Co the operation. For example, the shelf number is associated with an operation start position of a shelf which is subject to the operation in shelf information described later. In one operation instruction, one or a plurality of shelf numbers indicating one or a plurality of placing positions which is subject to the operation can be specified.

Next, map information which is referred to when the inventory robot 1 is moved is described. The map information is stored, for example, in the auxiliary storage device 413. In the system controller 410, the processor 411 determines or creates a route along which the inventory robot 1 moves with reference to the map information stored in the auxiliary storage device 413. When executing; the operation according to the operation instruction information, the processor 411 determines the moving route of the inventory robot 1 with reference to the map information. The map information includes a travelable area, an area where traveling is prohibited, and a position of an obstacle within the movement range of the inventory robot 1.

Next, shelf information indicating the placing position of an item on the shelf which is subject to the operation by the inventory robot 1 is described. FIG. 5 is a diagram illustrating a shelf information table stored in the auxiliary storage device 413 of the inventory robot 1. In the table shown in FIG. 5, the shelf information includes a shelf number, an operation start position, a direction, and a shelf width. The shelf number is used for specifying a shelf. The operation start position indicates the position at which the RFID reader 402 starts reading of information from the RF tag with respect to the placing position specified by the shelf number. In the table shown in FIG. 5, the operation start position is indicated by x-y coordinates (x coordinate and y coordinate) indicating the position on a horizontal plane.

Figure 6:
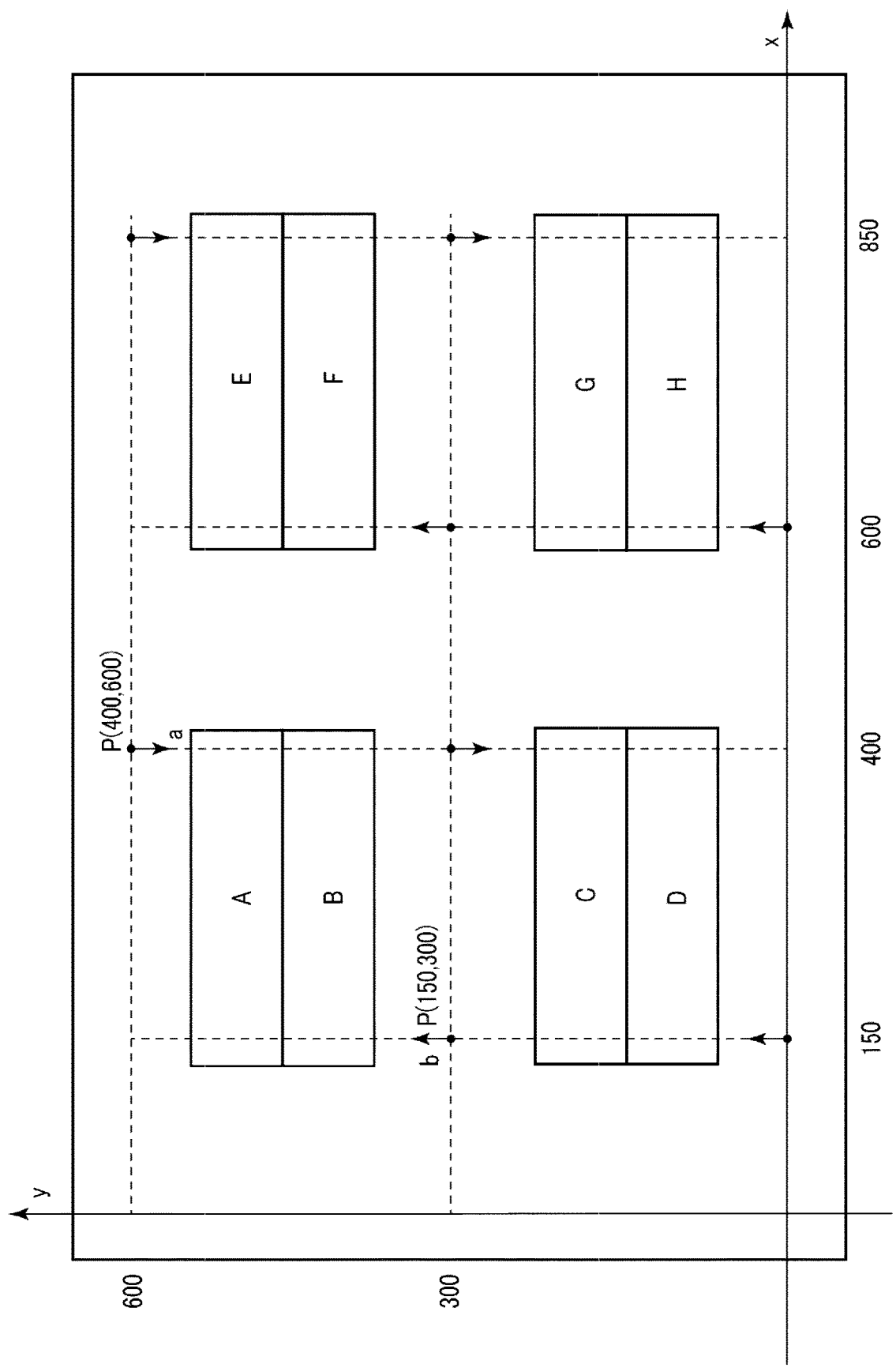
FIG. 6 is a diagram illustrating a relationship between positions in a moving range of an inventory robot and the arrangement of a plurality of shelves according to at least one embodiment.

FIG. 6 is a diagram illustrating a relationship between x-y coordinates indicating positions in the movement range of the inventory robot 1 and the arrangement of a plurality of shelves on which items are placed. The movement range shown in FIG. 6 is specified by map information, for example. Bach position in the movement range shown in FIG. 6 is indicated by x-y coordinates. For example, a position P (400, 600) shown in FIG. 6 is the position indicated by the x-y coordinates of the operation start position for a shelf number A shown in FIG. 5.

A direction indicates the direction that the surface of a shelf is facing (direction that the front side of the shelf faces) on the map indicated by the map information. In FIG. 6, there are a plurality of shelves on which shelf numbers are respectively set from A to H. For example, in a shelf whose shelf number is A, a surface viewed from the position P (400, 600) in the direction indicated by an arrow a is a front side. On the other hand, in a shelf whose shelf number is B, a surface viewed from a position P (150, 300) in the direction indicated by an arrow b is a front side. Since the RFID reader 402 reads information of the RF tag through radio waves, the RFID reader 402 may read the RP tag information of an item placed on the shelf of the number B from the front side of the shelf of the number A, but the RFID reader 402 may not always read. In addition, if items are densely placed on the shelf, the distance between an RF tag and another RF tag becomes shorter and the antenna characteristic of the RF tags changes, and therefore the distance within which the RFID reader is able to communicate with the RF tags tends to be shortened. Accordingly, if reading RF tag information of item densely arranged, it is required to perform reading by the RFID antenna 104 such that the RFID antenna moves closer to an item as much as possible from the front side of the shelf. Therefore, information relating to the direction of the shelf is effective to prevent an RP tag from being left in reading. A width information indicates the length of a shelf in a right and left direction (x-axis direction) of the shelf at each placing position specified by the shelf number.

Next, item information is described. FIG. 7 is a diagram illustrating item information table stored in the auxiliary storage device 413 of the inventory robot 1. The item information is information relating to an item subject to the monitoring. In FIG. 7, item information includes an item number, a unique ID, name, a color, a size, and a shelf number. The item number is an identification number for managing an item. For example, the item number is given for each SKU (Stock Keeping Unit) (minimum management unit). The unique ID is an identification number for uniquely specifying an individual item. The RF tag holds such information as a tag ID by combining the item number and the unique ID. The name, color, and size are information indicating the attribute of an item. The shelf number indicates a shelf on which an item is being placed.

Inventory Processing

Figure 8:
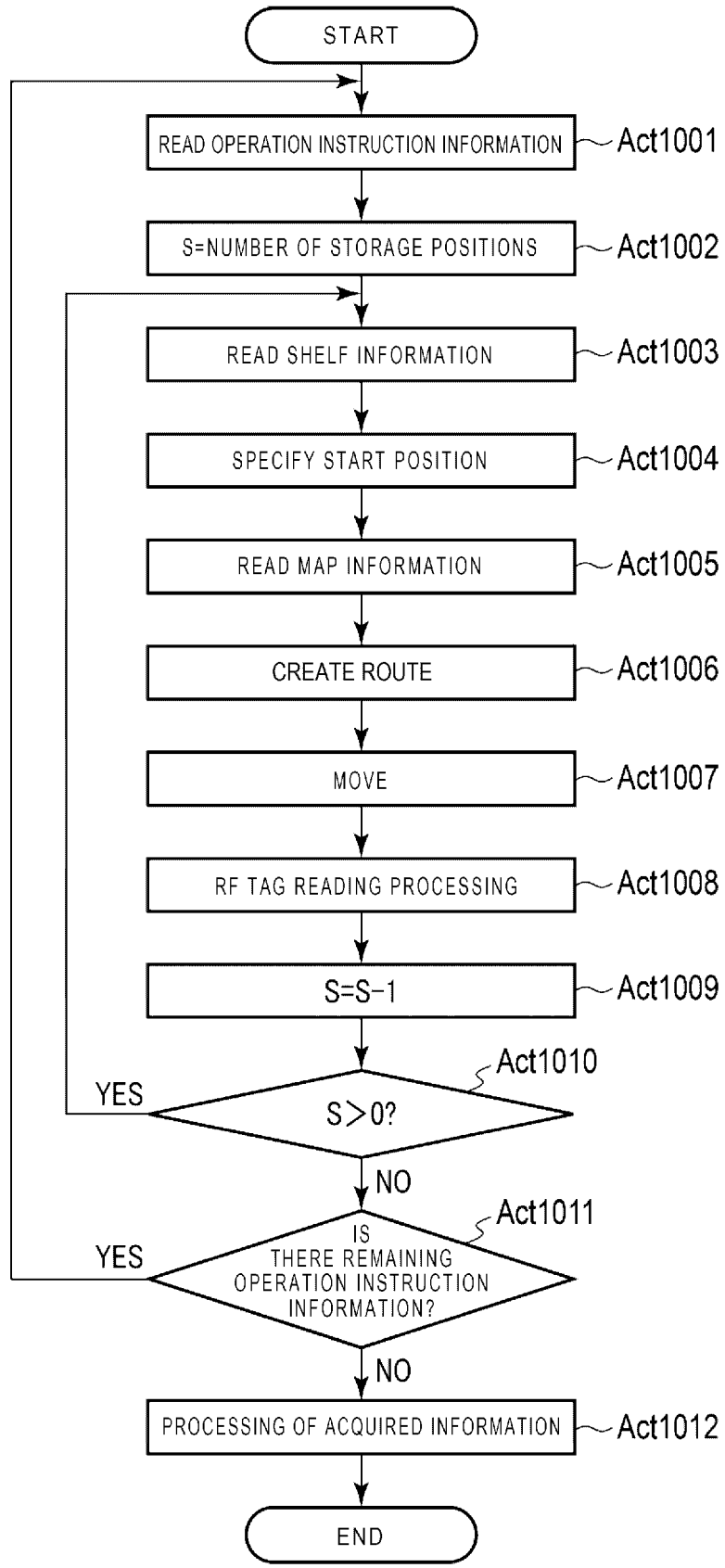
FIG. 8 is a flowchart illustrating inventory processing performed by an inventory robot according to at least one embodiment.

Next, inventory processing by the inventory robot 1 according to at least one embodiment is described. FIG. 8 is a flowchart illustrating an inventory processing by the inventory robot 1 according to at least one embodiment.

The system controller 110 receives an instruction for starting an operation by the hoot device (not shown) or through a user interface. When receiving the operation start instruction, the processor 411 of the system controller 410 reads the operation instruction information stored in the auxiliary storage device 413 (Act 1001). In at least one embodiment, the content of the operation instruction to be executed is inventory work. Therefore, the processor 411 reads the operation instruction information the content of which is the inventory processing.

Upon reading the operation instruction information, the processor 411 sets the number of placing positions (total number of placing positions) in the read operation instruction information as an initial value of a variable S indicating the number of remaining placing positions (Act 1002). If the variable S is set as an initial value, the processor 411 reads the shelf information (Act 1003) to specify a start position for a first placing position (placing position at which the operation is performed) with reference to the inventory information (Act 1004). For example, the processor 411 specifies a placing position number indicating a placing position subject to the operation from the operation instruction information. When the placing position number is specified, the processor 411 further specifies the coordinates of the start position corresponding to the placing position number based on the shelf information.

Upon specifying the start position, the processor 411 reads the map information (Act 1005) to create a route for moving from a current position to the start position with, reference to the map information (Act 1006), If the route is created, the processor 411 of the system controller 410 outputs an instruction including the created route to the moving mechanism 420.

The traveling controller 421 of the moving mechanism 420 drives the traveling motor 422 to move inventory robot 1 according to the driving instruction from the system controller 410 (Act 1007). After driving the traveling motor 422, the rotary encoder 423 of the moving mechanism 420 measures the rotation amount of the wheels 102. Information indicating the rotation amount of the wheels 102 measured by the rotary encoder 423 is periodically notified to the system controller 410. The processor 411 of the system controller 410 calculates the movement amount of the inventory robot 1 based on the rotation amount of the wheels 102 and the measurement data of the obstacle sensor 103. The processor 411 updates coordinates indicating the position of the inventory robot 1 in the traveling environment, i.e., movement range, as needed. The processor 411 determines content of a driving instruction such as a moving speed to be instructed to the moving mechanism 420 by checking the position of the inventory robot 1 updated to the route created. The processor 411 outputs the content of the driving instruction determined according to the position of the inventory robot 1 to the moving mechanism 420. In this manner, the processor 411 controls the moving speed of the inventory robot 1 in the horizontal direction.

The processor 411 executes reading of the RF tags (Act 1008). The processing in Act 1008 is described later. If a moving distance L reaches the width of the shelf, the processor 411 sends an RF tag reading stop instruction to the antenna switching controller 403 to end the reading of the RF tags, and subtracts 1 from the variable S (S=S−1) indicating the number of remaining placing positions (Act 1009). When the variable S is subtracted, the processor 411 determines whether or not the variable S (number, of remaining placing positions) is larger than 0 (Act 1010). If the variable S is larger than 0, in other words, if there is a placing position for which the operation (inventory work) is not yet completed in current operation instruction information (YES in Act 1010), the processor 411 executes the above-described processing in Acts 1003 to 1010 on a next placing position specified in the current operation instruction information.

On the other hand, if the variable C is 0, in other words, if the operation for all the placing positions specified in the current operation instruction information is completed (NO in Act 1010), the processor 411 determines whether or not there remains operation instruction information of which the operation is not performed (Act 1011). If there remains operation instruction information (YES in Act 1011), the processor 411 returns to the processing in Act 1001 and executes the above-described processing for the next operation instruction information.

If it is determined that there is no remaining operation instruction information (NO in Act 1011), the processor 411 executes information processing on the collected information (Act 1012). In this case, since the content of the operation is inventory work, the processor 411 executes information processing as inventory work based on the collected information (number of read items). The processor 411 transmits the collected information to the host device (not shown) and the host device may execute information processing on the collected information.

For example, the processor 411 reads information indicating a theoretical stock, and calculates a difference between the number of items actually counted for each item (number of read quantities) and the theoretical stock. The information indicating the theoretical stock may be stored in the auxiliary storage device 413 or may be acquired from the host device. Upon calculating the difference between the number of read quantities and the theoretical stock, the processor 411 creates an inventory result indicating the number of read quantities for each item, the theoretical stock, and the difference therebetween. After creating the inventory result, the processor 411 stores the inventory result in the auxiliary storage device 413. Otherwise, the processor 411 may transmit the inventory result to the host device.

Figure 9:
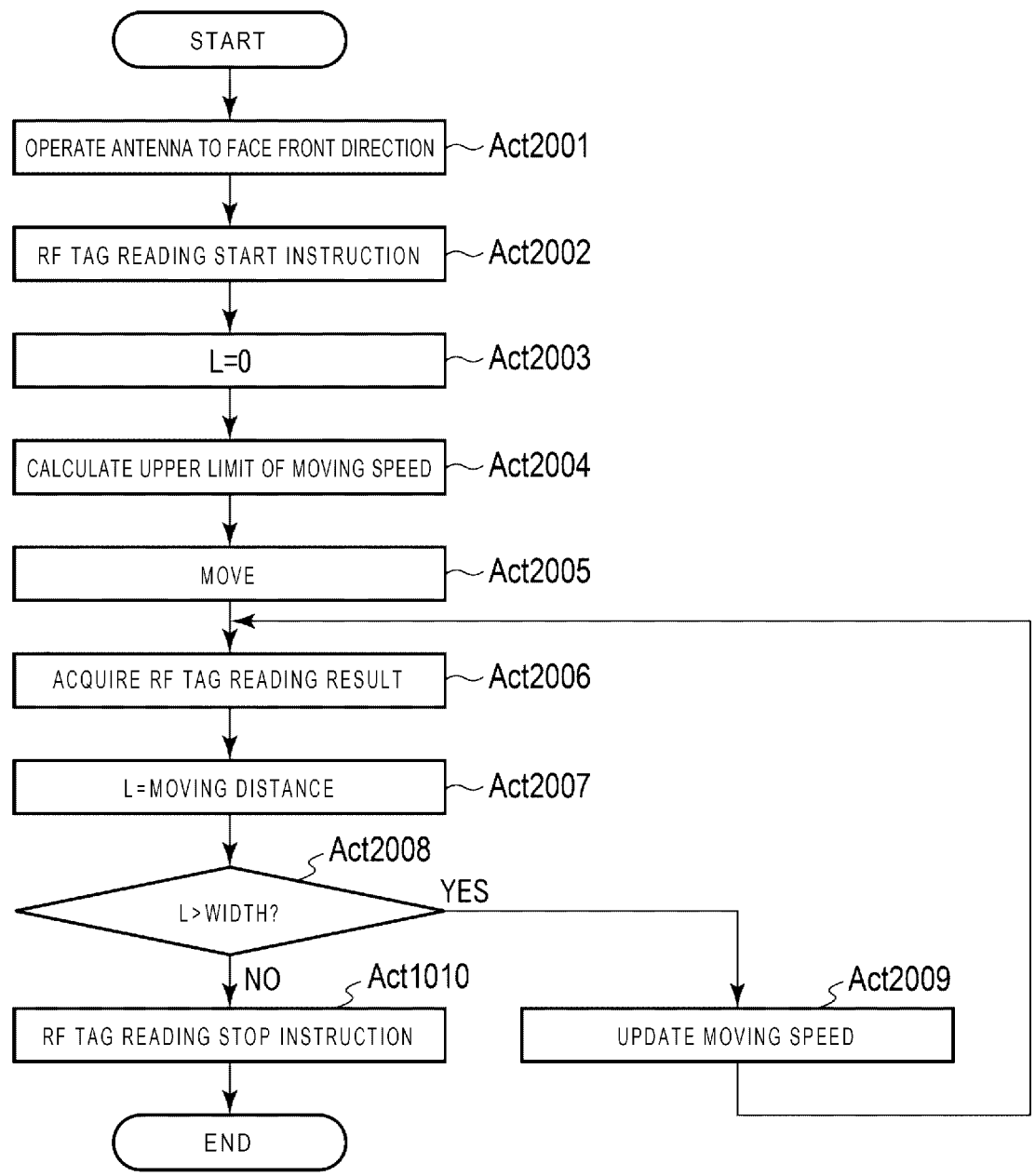
FIG. 9 is a flowchart illustrating reading processing on an RF tag by an inventory robot.

Next, reading processing on the RF tags and a calculation of the upper limit of the moving speed in Act 1008 is described. FIG. 9 is a flowchart illustrating the reading processing on the RF tags and the upper limit calculation of the moving speed of the inventory robot 1 according to at least one embodiment.

If the position of the inventory robot 1 reaches the start position, the processor 411 outputs a driving instruction in which the RFID antenna 104 directly faces the shelf (front side of the shelf) specified by the shelf information to the moving mechanism (Act 2001). When the RFID antenna 104 faces the front side of the shelf, the processor 411 outputs an RF tag reading start instruction to the antenna switching controller 403 (Act 2002). The processor 411 sets the movement distance L to 0 (zero) (Act 2003). Thereafter, the processor 411 calculates an upper limit of the moving speed (Act 2004) and outputs a driving instruction to the moving mechanism 420 to advance the inventory robot 1 while maintaining the orientation relationship of the RFID antenna 104 and the shelf (Act 2005). At this time, the processor 411 determines the upper limit of the moving speed in the driving instruction output to the moving mechanism 420. The processor 411 sets the upper limit value Vmax of the moving speed of the plurality of RFID antennas based on the width of the reading range per one of the plurality of RFID antennas 104 and the number of combinations of the RFID antennas.

For example, the processor 411 sets the upper limit value Vmax of the moving speed of the plurality of RFID antennas (inventory robot 1) based on the first value obtained by dividing the width of the reading range per one of the plurality of RFID antennas 104 by the number of combinations of the RFID antennae. In other words, the processor 411 sets the upper limit value Vmax of the moving speed of the inventory robot 1 at the time of reading the ID of the RF tags by using a value obtained by "the width W of the reading range per one of the plurality of RFID antennas 304/the number of combinations N of the plurality of RFID antennas 104". A combination of preset RFID antennas may be set as one pair of one selected from a plurality of RFID antennas or may be set as one pair of two or more RFID antennas. For example, consecutive RFID antennas 104a and 104b may be set as one pair, and consecutive RFID antennas 104c and 104d may be set as one pair (see FIG. 1). Alternatively, taking the interference of radio waves into consideration, a plurality of nonconsecutive RFID antennas may be set as one pair. For example, nonconsecutive RFID antennas 104a and 104c may be set as one pair, and nonconsecutive RFID antennas 104b and 104d may be set as one pair (see FIG. 1). In this manner, the influence of radio wave interference may be reduced.

Further, the processor 411 may set the upper limit value Vmax of the moving speed of the plurality of RFID antennas (inventory robot 1) based on the width of the reading range per one of the plurality of RFID antennas 104, the number of combinations of the RFID antennas, and the time required for one RFID antenna to reach a predetermined reading rate as the first value.

For example, the processor 411 may set the upper limit value based on a second value obtained by dividing the above-mentioned first value by the time required for one of the RFID antennas to reach a predetermined reading rate. As shown in the following Equation (1), the processor 411 sets the moving speed of the inventory robot 1 at the time of reading the ID of an RF tag to a value Vmax obtained by further dividing a value, obtained by dividing W (width of reading range) by N (number of combinations of the RFID antennas), by "a time T required to reach the predetermined reading rate per one of the plurality of RFID antennas 104".

$$V_{max} = \frac{W}{N \cdot T} \quad (1)$$

The width W of the reading range per one of the plurality of RFID antennas 104 is set as the width in the right and left direction (moving direction of the RFID antennas) as viewed from the center of one RFID antenna 104 that can reliably read information of the RF tag when the distance from one RFID antenna 104 to the RF tag is fixed. Since the width W of this reading range varies depending on the directivity of one RFID antenna 104, the transmission output of the RFID reader 402, and the distance from one RFID antenna 104 to the RF tag, the value of W is determined by performing preliminary evaluation at the time of designing the inventory robot 1. For example, if the directivity of one RFID antenna 104 is about 80° in terms of a half-power angle, the transmission output of the RFID reader 402 is 125 mW, and the distance from one RFID antenna 104 to the RF tag is 30 cm, the width W of the reading range is about 50 cm.

The number of combinations N of RFID antennae is a value obtained if radio waves are transmitted by combining, a plurality of RFID antennas. For example, if there are four RFID antennas 104 and radio waves are transmitted one by one from each RFID antenna, N=4. The antenna switching controller 403 instructs the RFID reader 402 to switch the operation of the RFID antenna 104 (timing of starting and stopping of radio wave transmission). For example, the operation of the RFID antenna 104 is switched in such a manner that the radio wave transmission periods of the plurality of RFID antennas 104 do not overlap with one another. As a result, the radio wave transmission periods of the plurality of RFID antennas 104 are shifted. The operation of the RFID antenna 104 may be switched in such a manner that a part of each of the radio wave transmission periods of the plurality of RFID antennas 104 overlaps with one another.

Further, if there are four RFID antennas 104, and radio waves are transmitted from one pair of two RFID antennas, N=2. For example, taking the interference of radio waves into consideration, two RFID antennas, that are not arranged consecutively are set as one pair. Two of the RFID antenna 104a and the RFID antenna 104c are set as a first pair, and two of the RFID antenna 104b and the RFID antenna 104d are set as a second pair. The antenna switching controller 403 instructs the RFID reader 402 to switch the operation of the RFID antenna 104 (timing of starting and stopping of radio wave transmission). For example, the operation of the RFID antenna 104 is switched in such a manner that the radio wave transmission periods of the same pair of RFID antennas 104 overlap with one the other and the radio wave transmission periods of a different pair of RFID antennas 104 do not overlap. As a result, the radio wave transmission periods of the same pair of RFID antennas 104 overlap, and the radio wave transmission periods of the different pair of RFID antennas 104 are shifted. The operation of the RFID antenna 104 may be switched in such a manner that a part of each of the radio wave transmission periods of the different pair of RFID antennas 104 overlaps.

In a case in which the number of RFID antennas 104 and RFID readers 402 is increased to cover the reading range in the height direction of the shelf, if a plurality of RFID readers transmit radio waves at the same time, interference occurs because an RF tag receives, at the same time, requests from the RFID readers, and thus the RP tag cannot respond correctly. Therefore, it is necessary to set, at one time, an upper limit on the number of RFID readers that transmit radio waves at the same time. Since, in fact, the radio waves are transmitted via the RFID antenna, the number of combinations of RFID antennas used for radio wave transmission is a variable necessary in the design of such a system.

The time T required for reaching the predetermined reading rate per one of the plurality of RFID antennas 104 is defined by the following expression;

$$T = \frac{A \cdot R}{T_r} \quad (2)$$

wherein A is the estimated value of the number of RF tags present within the reading range of one RFID antenna 104, R is the reading rate of a target RF tag in a state where the moving mechanism 420 is not operated, and Tr is the average reading time per RF tag. For example, R=0.9, Tr=10 ms, T=900 ms if A=100.

The antenna switching time by the antenna switching controller 403 is sufficiently short as compared with the information reading time from an RF tag, and thus the antenna switching time is not considered in at least one embodiment. However, if a pause time is set at the time of antenna switching according to legal requirements and a thermal control, for example, the antenna switching time may be added to T (time required for reaching the predetermined reading rate per one of the plurality of RFID antennas 104).

In the above described equation (1), if W=50 cm, N=4, and T=900 ms:

$$V_{max} = \frac{0.5}{4 \cdot 0.9} \cong 0.14$$

The upper limit value Vmax is 0.14 m/s or 14 cm/s.

In another case, the processor further sets, an upper limit value based on a second value obtained by multiplying the first value by the reciprocal of an average use time of one antenna. As shown in the following Equation (3), the processor 411 sets the upper limit value Vmax to a value obtained by multiplying a value obtained by dividing W by N by "a reciprocal K of the average use time per one of the plurality of RFID antennas 104".

$$V_{max} = K \frac{W}{N} \quad (3)$$

The average use time per one of the plurality of RFID antennas 104 is basically a radio wave transmission time, and, the upper limit of the transmission time is used as the average use time, if the plurality of RFID antennas 104 are switched at the upper limit of the transmission time per one REID antenna. On the other hand, if the antenna switching is performed, at a point at which the number of RF tags to be read per unit time falls below the lower limit value, the average time until the number of RF tags to be read per unit time falls below the lower limit value may be the average use time per one of the plurality of REID antennas 104. The antenna switching time, the pause time of radio wave transmission according to legal requirements, and the pause time for a thermal control of the RFID reader 402 may be added to the average usage time per one of the plurality of RFID antennas 104, in addition to the radio wave transmission time.

When receiving the RE tag reading result from the antenna switching controller 403 (Act 2006), the processor 411 calculates a moving distance L from the start of RE tag reading based on the rotation amount of the rotary encoder 423 (Act 2007). Then, if the moving distance L is not reaching the width in the shelf information of the shelf specified by the shelf number (YES in Act 2008), the processor 411 updates the moving speed from the RE tag reading result acquired immediately before (Act 2009). If the moving distance L reaches the width in the shelf information of the shelf specified by the shelf number (No in Act 2008), the processor 411 sends an RE tag reading stop instruction to the antenna switching controller 403 (Act 2010) to end the RF tag reading.

Next, the moving speed of inventory robot 1 is described. As is described hereinafter, the processor 411 sets the moving speed according to the number of RF tags to be read per unit time by the plurality of RFID antennas.

The moving speed is determined by the processor 411 under the condition as shown in FIG. 10. In FIG. 10, $R_t$ is the number of RF tags to be read per unit time, and $R_{max}$ is the number of RF tags to be read per unit time if RF tags are readable at a maximum efficiency.

If the condition of a relational expression $R_t < 0.2 R_{max}$ is satisfied, the processor 411 sets the moving speed to the maximum value $V_{max}$. That is, if the number of RF tags to be read per unit time $R_t$ is relatively small, the moving speed is set to the maximum value $V_{max}$. Also, if the condition of another relational expression $0.2 R_m \leq R_t \leq 0.8 R_{max}$ is satisfied, the processor 411 sets the moving speed to $(1-R_t/R_{max}) V_{max}$. That is, if the number of RF tags to be read per unit time falls within a predetermined range, the moving speed is set to be slightly lower than the maximum value $V_{max}$. In addition, if the condition of a still another relational expression $R_t > 0.8 R_{max}$ is satisfied, the processor 411 sets the moving speed to $0.2 V_{max}$. That is, if the number of RF tags to be read per unit time is relatively large, the moving speed is set to a significantly lower speed than the maximum value $V_{max}$.

By updating the moving speed in response to such conditions described above, if RF tags within the reading range of the RFID antenna 104 are still insufficiently read, the moving speed is lowered to prevent occurrence of omission of reading the RF tag in a situation in which a large number of RF tags are present.

In the table in FIG. 10, the moving of the inventory robot 1 is continued without setting the moving speed to 0 even if the number of RF tags to be read per unit time $R_t$ is close to the maximum efficiency ($R_{max}$). This comes from a tendency that it is easier to read RF tags which ore difficult to read due to reflected waves and phases while the inventory robot 1 is moving slightly, but if such tendency is not considered, the moving speed may be set to 0 if $R_t$ is close to the maximum efficiency ($R_{max}$).

FIG. 11 illustrates a table showing the inventory work result (result of aggregating the collected information). In the table shown in FIG. 11, the inventory work result includes information such as an item number, the number of a theoretical stock, the number of read quantities, and a difference. The item number indicates the item subject to the inventory work. The number of the theoretical stock is the number of stock of items on a book managed in the inventory management. The number of read quantities is the number of items counted based on the reading result of the RF tags by the RFID reader 102 and the RFID antenna 104 in the above processing. The difference is a quantity obtained by subtracting the number of actually read quantities from the number of theoretical stock. Since the information (tag ID) read from the RF tag includes the item number and the unique ID, it can indicate a tag ID which is not detected if the difference occurs.

Figure 12:
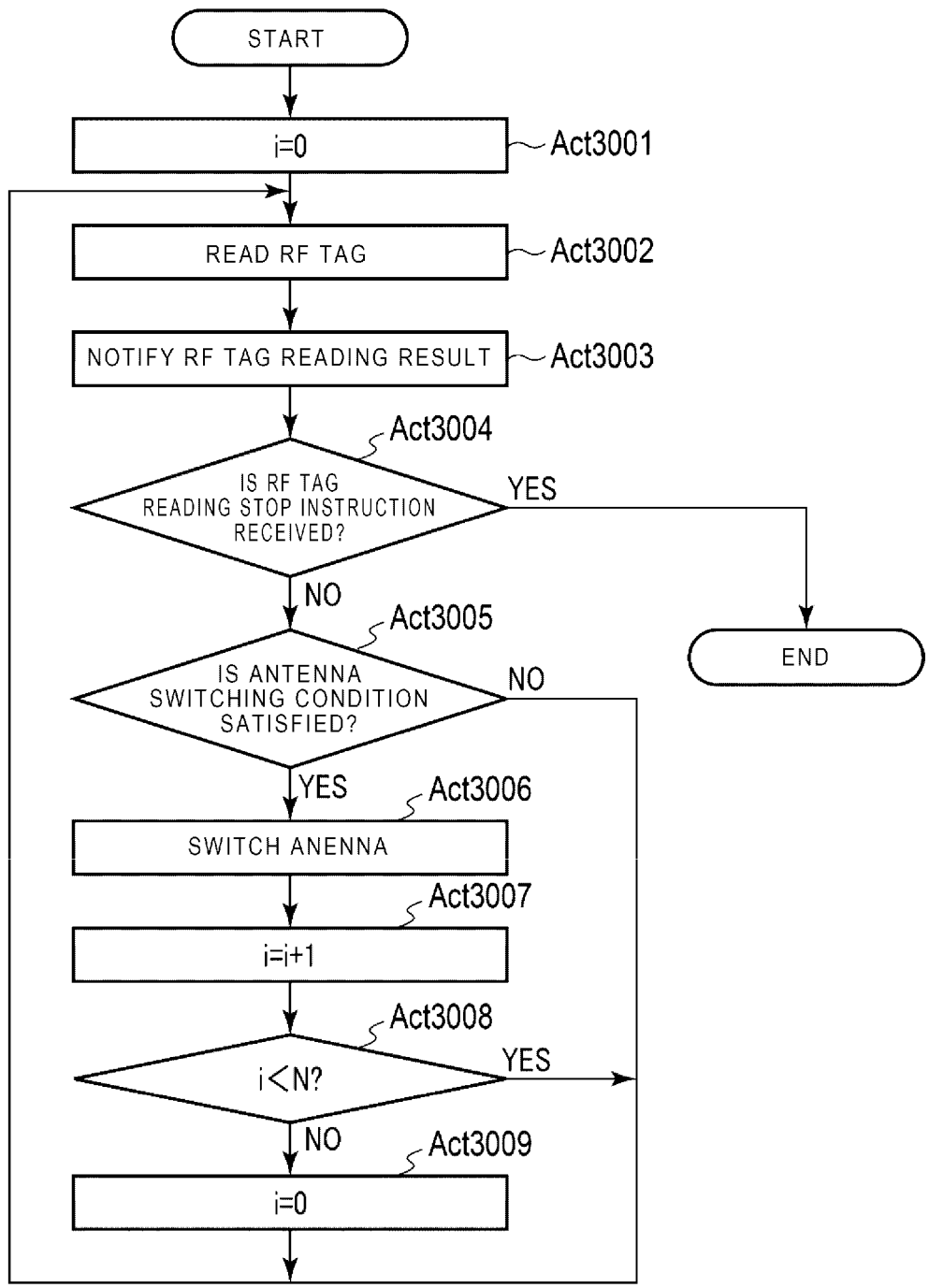
FIG. 12 is a flowchart illustrating antenna switching processing according to at least one embodiment.

Next, an antenna switching processing by the antenna switching controller 403 is described with reference to FIG. 12. If receiving an RF tag reading start instruction from the processor 411, the antenna switching controller 403 starts a processing to repeat, as described below, selection of combination of the RFID reader 402 and the RFID antenna 104 to be used, reading of an RF tag, RF tag reading result notification to the processor 411, and an antenna switching according to the antenna switching condition satisfied until an RF tag reading stop instruction is received.

The antenna switching controller 403 sets selection of combination i to an initial value 0 (Act 3001). For example, allocating a number to the RFID reader 402 or the RFID antenna 104 and selecting this number corresponds to the selection of combination. As shown in FIG. 2, if the plurality of RFID readers 402 are connected, they may be respectively specified by connection port numbers. As shown in FIG. 3, if the plurality of RFID antennas 104 are connected to one RFID reader 402e, they may be respectively specified by antenna numbers. If a plurality of RFID antennas are used in combinations, pair numbers are respectively assigned to pairs of antennas, and the pair number may be used to specify an antenna pair.

The antenna switching controller 403 executes reading processing of an RF tag (Act 3002). In the reading processing of an RF tag, an instruction to the RFID reader 402 selected by the selection of combination is transmitted from the antenna switching controller 403 to read information including the tag ID from the RF tag. The antenna switching controller 403 notifies the processor 411 of the RF tag reading result (Act 3003).

The antenna switching controller 403 determines whether or not an RF tag reading stop instruction is received from the processor 411 (Act 3004). If the antenna switching controller 403 receives the RF tag reading stop instruction (YES in Act 3004), the antenna switching controller 403 ends the antenna switching processing.

If the antenna switching controller 403 does not receive the RF tag reading stop instruction (NO in Act 3004), the antenna switching controller 403 determines whether or not an antenna switching condition is satisfied (Act 3005). It is determined that the antenna switching condition is satisfied in a case in which, for example, the radio wave transmission time reaches an upper limit which is set for the radio wave transmission time per one RFID antenna. Thus, each RFID antenna can read RF tags over the same time. Alternatively, a minimum number of RF tags to be read per RFID antenna 104 is provided, and it may be determined that the switching condition is satisfied in a case in which the number of RF tags read by the RFID reader 402 falls below the minimum number of RF tags to be read. Alternatively, a lower limit value of the number of RF tags to be read per unit time is provided, and it may be determined that the switching condition is satisfied in a case in which the number of RF tags to be read per unit time falls below the lower limit value. For example, if the lower limit value is set to one, the switching condition is satisfied if the RF tags are no longer read.

If the antenna switching condition is not satisfied (NO in Act 3005), the antenna switching controller 403 repeats the processing in Acts 3002 to 3005. If the antenna switching condition is satisfied (YES in Act 3005), the antenna switching controller 403 executes the antenna switching processing (Act 3006).

The antenna switching controller 403 sets the selection of combination i to i+1 (Act 3007). The antenna switching controller 403 determines whether or not the selection of combination i is less than the number of combinations N of the RFID antennas (Act 3008).

If the selection of combination i is less than the number of combinations N of the RFID antennas (YES in Act 3008), the antenna switching controller 403 repeats the processing in Acts 3002 to 3005.

If the selection of combination i is not less than the number of combinations N of the RFID antennas (NO in Act 3008), the antenna switching controller 403 sets the selection of combination i to an initial value 0 (Act 3009). The antenna switching controller 403 repeats the processing in Acts 3002 to 3005.

Modifications

Figure 13:
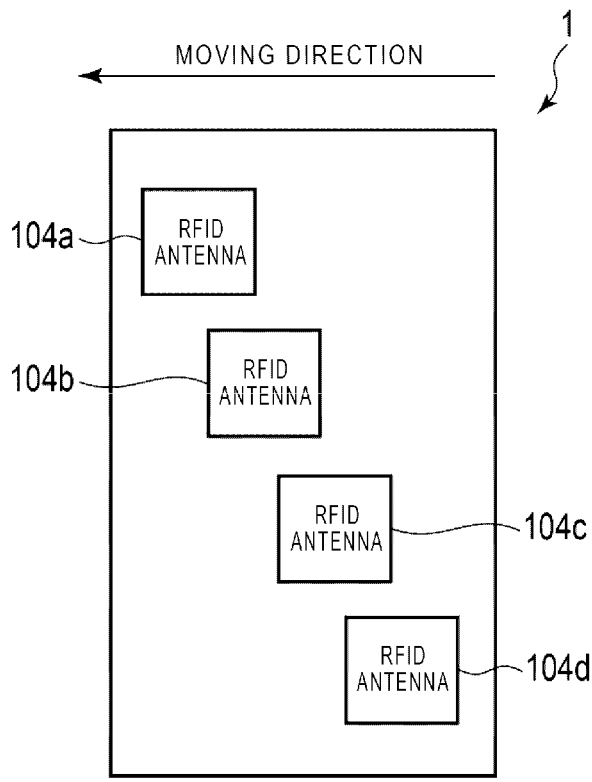
FIG. 13 is a diagram illustrating a modification of an inventory robot according to at least one embodiment.

FIG. 13 is a diagram showing a modification of the inventory robot 1. The RFID antennas 104a, 104b, 104c, and 104d are arranged by being shifted from each other in the moving direction of the inventory robot 1. In this modification, the processor 411 may control the RFID antennas 104a, 104b, 104c, and 104d to sequentially start the reading of RF tags with a time difference. For example, first, the RFID antenna 104a transmits radio waves for a certain period of time to read RF tags over the certain time, next, the RFID antenna 104b transmits radio waves for the certain period of time to read RF tags over the certain time, then the RFID antenna 104c transmits radio waves for the certain period of time to read RF tags over the certain time, and then the RFID antenna 104d transmits radio waves for the certain period of time to read RF tags over the certain time. Thereafter, the RFID antennas 104 read RF tags in the same order as described above. The processor 411 sets the moving speed according to a positional deviation amount in the moving direction of the RFID antennas 104a, 104b, 104c, and 104d (inventory robot). For example, the moving speed is set in such a manner that the deviation amount in the moving direction is the same as the moving distance for a certain time. As a result, it can reduce the omission of reading the RF tags attached to the items placed, on the shelves having different heights.

Figure 14:
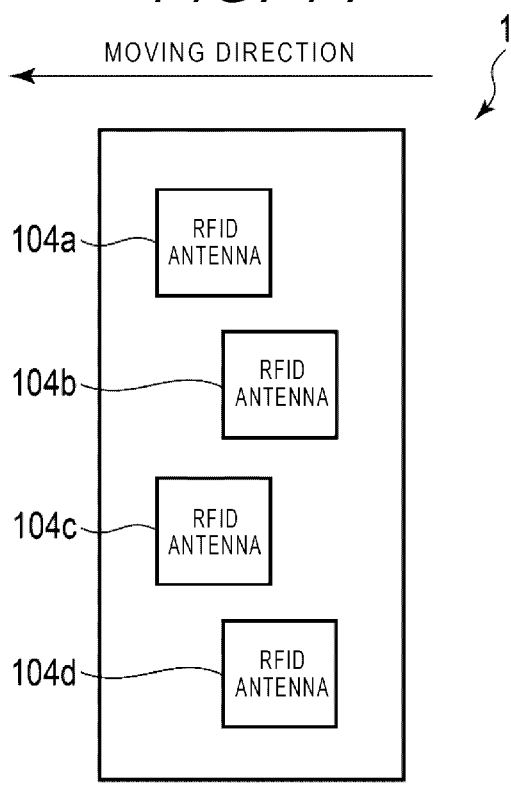
FIG. 14 is a diagram illustrating another modification of an inventory robot according to at least one embodiment.

FIG. 14 is a diagram illustrating another modification of the inventory robot 1. As shown in FIG. 14, a first pair of the RFID antenna 104a and the RFID antenna 104c, a second pair of the RFID antenna 104b and the RFID antenna 104d are arranged such that the first and the second pairs are shifted in the moving direction of the inventory robot 1. In this modification, the processor 411 may control the RFID reader to start reading of RF tags sequentially with a time difference between the first pair of the RFID antenna 104a and the RFID antenna 104c, and the second pair of the RFID antenna 104b and the RFID antenna 104d. For example, the first pair of the RFID antenna 14a and the RFID antenna 14c first transmit radio waves for a certain period of time to read RF tags over the certain time, and then, the second pair of the RFID antenna 14b and the RFID antenna 14d transmit radio waves for a certain period of time to read RF tags over a certain time. Thereafter, the first and the second pairs read RF tags in the same order as described above.

Further, the processor 411 sets the moving speed according to the positional deviation amount in the moving direction of the first pair of the RFID antenna 104a and the RFID antenna 104c and the second pair of the RFID antenna 104b and the RFID antenna 104d. As a result, it can reduce the omission of reading the RF tags attached to the items placed on the shelves having different heights.

The setting of the upper limit value Vmax of the moving speed of the inventory robot 1 in the horizontal direction is not limited to the techniques described above. For example, the upper limit value Vmax is the upper limit of the moving speed corresponding to the reading direction of an RF tag. The upper limit value Vmax is set as the upper limit of the moving speed in the x-axis direction in the case of reading the RF tags while the inventory robot 1 is moving along the x-axis direction. If the RF tag is not read while the inventory robot 1 is moving along the y-axis direction, the upper limit value Vmax may be similarly set as the upper limit of the moving speed in the y-axis direction, or a moving speed higher than the upper limit value Vmax may be set as the upper limit. For example, as the upper limit of the moving speed in the y-axis direction, the upper limit of the moving speed may be set based on the performance of the moving mechanism 420. As a result, it can shorten the moving time in the y-axis direction.

In the above description, a case in which the inventory robot 1 including the plurality of RFID antennas 104 arranged in the vertical direction (z-axis direction) sets the upper limit value Vmax of the moving speed of the inventory robot 1 in the horizontal direction (x-axis direction) based on the width (length in the horizontal direction (x-axis direction) along which the inventory robot 1 moves) of the reading range per one of the plurality of antennas and reads the RF tags attached to the items while moving in the horizontal direction (x-axis direction) is shown, but it 1b not limited thereto. For example, it can be also applied to a case in which an inventory robot including a plurality of RFID antennas arranged in the horizontal direction (x-axis direction) sets the upper limit value Vmax of the moving speed of the inventory, robot 1 in the vertical direction (z-axis direction) based on the width (length in the z-axis direction) of the reading range per one of the plurality of antennas and reads the RF tags attached to the items while moving in the vertical direction.

Inventory processing by the inventory robot 1 can be executed by one or more processors according to one or more packages of software. For this reason, by merely installing and executing one or more programs into the main storage device 412 of the inventory robot 1 through a computer-readable storage medium storing the one or more programs for executing the inventory processing, the above-described inventory processing can easily be realized. For example, the inventory robot 1 downloads the program via the network, stores the downloaded program, and can complete the installation of the program. Alternatively, the inventory robot 1 reads the program from an information storage medium, stores the read program, and can complete the installation of the program.

While certain embodiments have been described, these embodiments have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

What is claimed is:
1. A movable reading apparatus comprising:
   an enclosure provided with wheels, the enclosure being movable by the wheels;
   a plurality of antennas disposed on the enclosure and configured to be movable at a prescribed moving speed, which perform transmission/reception of signals for communicating with wireless tags;

a controller configured to switch operations of one or a combination of antennas selected from the plurality of antennas;

a reader configured to read identification information of the wireless tags from the signals received by the plurality of antennas; and a processor configured to set an upper limit value of the moving speed of the plurality of antennas based on a first value obtained by dividing a width of a reading range per one of the plurality of antennas by a number of combinations of the antennas, wherein the controller is configured to switch the operation of one or more antennas of the plurality of antennas when a number of wireless tags read by the reader falls below a predetermined number.

2. The apparatus according to claim 1, wherein the processor is further configured to set the upper limit value based on a second value obtained by dividing the first value by a time required for one of the plurality of antennas to reach a prescribed reading rate.

3. The apparatus according to claim 1, wherein the processor is further configured to set the upper limit value based on a second value obtained by multiplying the first value by a reciprocal of an average use time of one of the antennas.

4. The apparatus according to claim 1, wherein the processor is configured to set the moving speed according to a number of the wireless tags to be read per unit time by the plurality of antennas.

5. The apparatus according to claim 1, wherein the upper limit value is set with respect to a horizontal direction based on the width of the reading range in the horizontal direction.

6. The apparatus according to claim 1, wherein the processor is configured to set the moving speed based on a deviation in a moving direction between a first pair of the antennas and a second pair of the antennas.

7. A movable reading apparatus comprising:
an enclosure provided with wheels, the enclosure being movable by the wheels;
a plurality of antennas disposed on the enclosure and configured to be movable at a prescribed moving speed, which perform transmission/reception of signals for communicating with wireless tags;
a controller configured to switch operations of one or a combination of antennas selected from the plurality of antennas;
a reader configured to read identification information of the wireless tags from the signals received by the plurality of antennas; and
a processor configured to set an upper limit value of the moving speed of the plurality of antennas based on a first value obtained by dividing a width of a reading range per one of the plurality of antennas by a number of combinations of the antennas,
wherein the controller is configured to switch the operation of one or more antennas of the plurality of antennas based on a lower limit value of a number of wireless tags to be read per unit time.

8. A movable reading apparatus comprising:
a plurality of antennas, configured to be movable at a prescribed moving speed, which perform transmission/reception of signals for communicating with wireless tags;
a controller configured to switch operations of one or a combination of antennas selected from the plurality of antennas;
a reader configured to read identification information of the wireless tags from the signals received by the plurality of antennas; and
a processor configured to set an upper limit value of the moving speed of the plurality of antennas based on a first value obtained by dividing a width of a reading range per one of the plurality of antennas by a number of combinations of the antennas,
wherein the controller is configured to switch the operation of one or more antennas of the plurality of antennas when a number of wireless tags read by the reader falls below a predetermined number.

* * * * *